J. LA FRENIER.
SNARE TRAP.
APPLICATION FILED SEPT. 13, 1912.
1,091,923.
Patented Mar. 31, 1914.
2 SHEETS—SHEET 1.
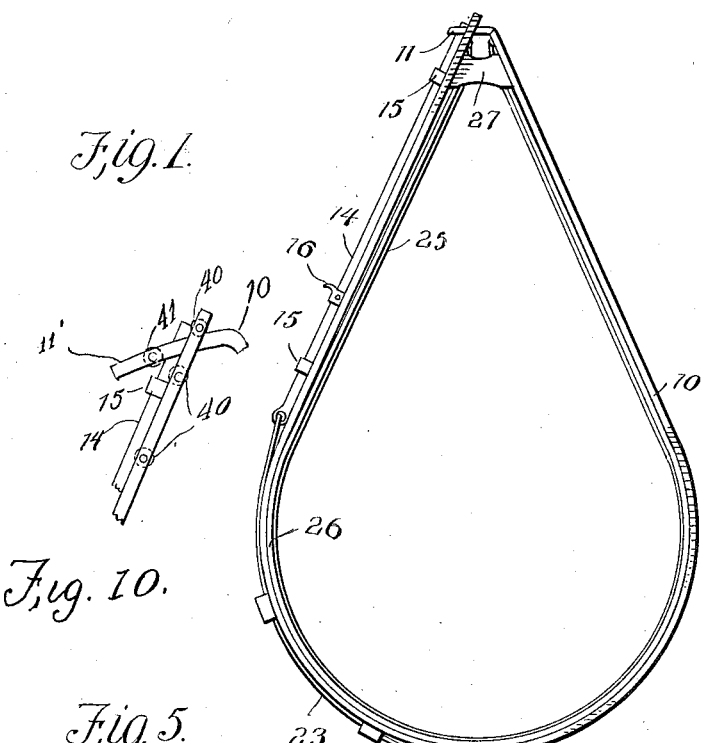
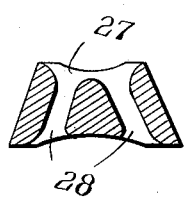
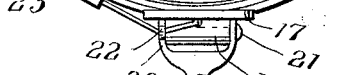
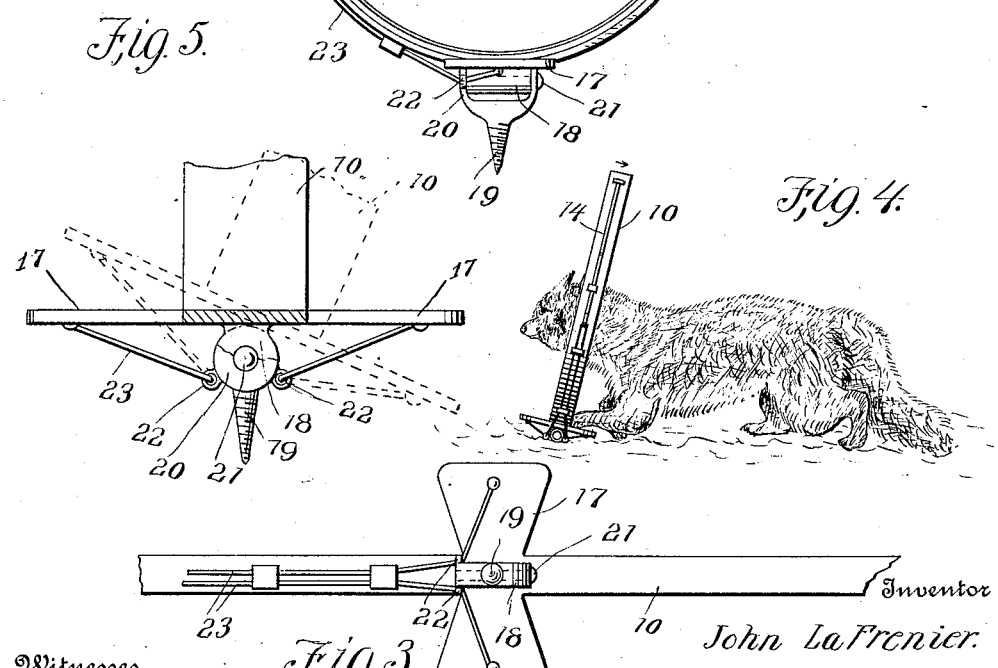
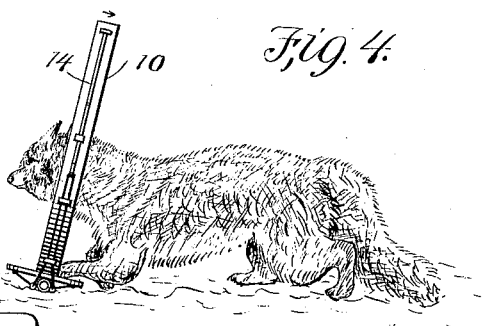
Witnesses
William Smith.
Chas. R. Nielsen.
Inventor
John LaFrenier.
By H. L. Woodward
Attorney J. LA FRENIER.
SNARE TRAP.
APPLICATION FILED SEPT. 13, 1912.
1,091,923.
Patented Mar. 31, 1914.
2 SHEETS—SHEET 2.
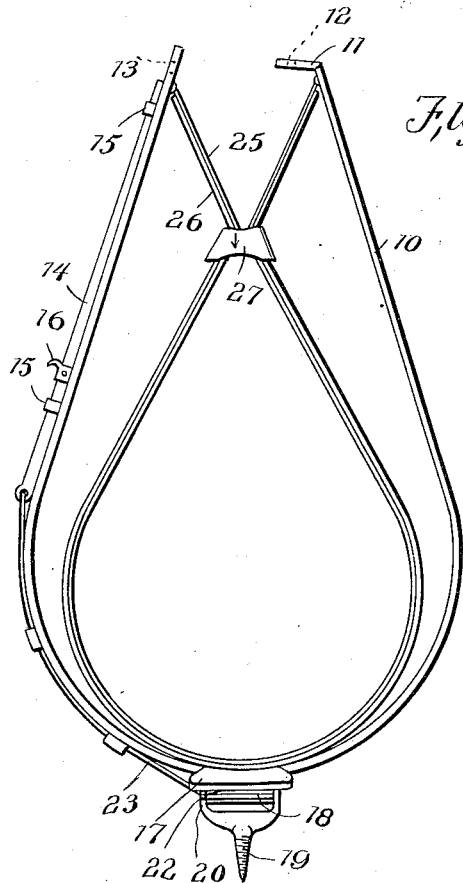
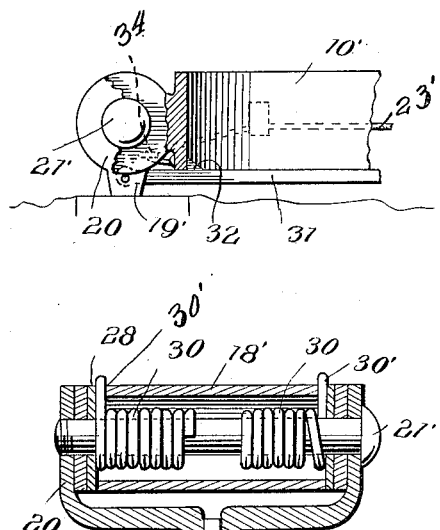
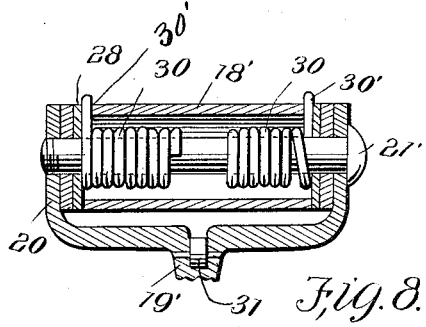
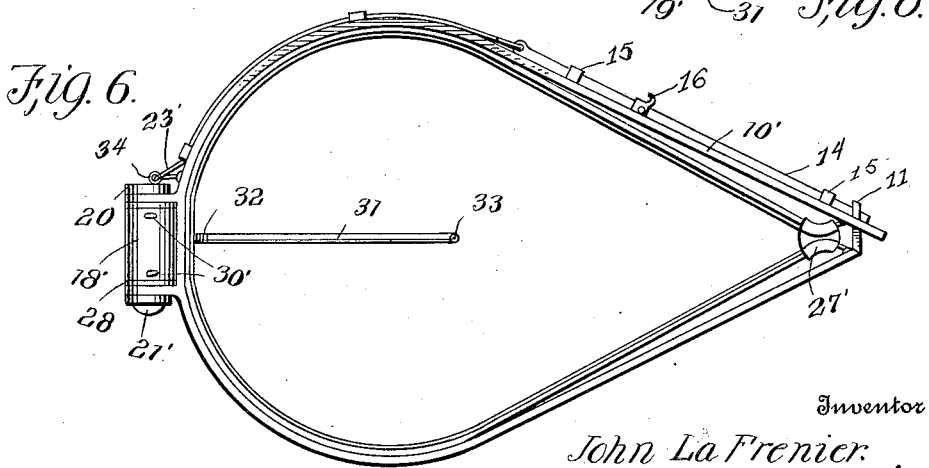
Witnesses
William Smith.
Chr. R. Nielsen.
Inventor
John La Frenier.
By H L Woodward
Attorney

UNITED STATES PATENT OFFICE.

JOHN LA FRENIER, OF WALKER, MINNESOTA.

SNARE-TRAP.

1,091,923.

Specification of Letters Patent.   Patented Mar. 31, 1914.

Application filed September 13, 1912.   Serial No. 720,280.

*To all whom it may concern:*

Be it known that I, JOHN LA FRENIER, a citizen of the United States, residing at Walker, in the county of Cass and State of Minnesota, have invented new and useful Improvements in Snare-Traps, of which the following is a specification.

This invention relates to traps, more particularly to snare traps of a type suitable for use in capturing large or small animals, without damage to the pelt. It is also useful in the capture of vermin of various kinds.

An important object of the invention is to provide a device of this kind which will be extremely simple in construction and adapted to be manufactured from stock material at a low cost.

A further object is to provide such a device which will be simple to manipulate.

An important object is to provide a device of this nature which when released by an animal, will tend to move toward the animal during operation, insuring its positive engagement upon a victim.

A further object is to provide a novel releasing mechanism.

An important object is to provide such a device which may be concealed in a horizontal position in a path, and which, upon release by an animal passing thereover will operate to engage a noose around the animal, drawing it taut and holding the victim until released by the trapper.

Other objects and advantages will be apparent from the specification and from the drawings, in which, Figure 1 is a side view of the device in set position, Fig. 2 is a similar view in released position, Fig. 3 is a bottom view of the device in open position, Fig. 4 is a side view of the device at the moment of operation by the victim, Fig. 5 is a detail cross section at the bottom of the trap showing the means for mounting and the trigger mechanism, Fig. 6 is a plan view of a modified form of the device, Fig. 7 is a fragmentary sectional view of the modified form, Fig. 8 is a detail sectional view of the operating mechanism of the modified form. Fig. 9 is a detail sectional view of the snare block. Fig. 10 is a fragmentary view of a modification.

There is illustrated a trap comprising a spring bar 10, which is in the form of a long strap of resilient steel, one end of which is tenoned as at 11, an aperture 12 being formed in the extremity of the tenon, the tenon being bent inwardly toward what is the upper side of the spring when open, and engaged slidably through a suitable eye 13 in the opposite end of the spring, the spring tending normally to extend in a rectilinear form, and requiring to be bent with some force to bring the tenon through the eye 13, as described. In this position the device presents the form of a pear section. The tenon is engaged after projecting through the eye 13 by a sliding bolt 14 carried on the outer side of the spring, being retained by suitable guides 15, and having a thumb hold 16 thereon by which it may be moved manually to engage the aperture 12 as described.

Formed integrally with the spring adjacent its middle, there are laterally extending wings 17. A suitable hinge knuckle 18 is carried on the lower side of the spring between the wings, and connected pivotally therewith is a screw 19 adapted to be engaged in a block of wood or in a log. The screw is provided with two apertured ears disposed in registry with the passage through the knuckle 18, and a suitable bolt 21 is engaged therethrough.

The ears 20 adjacent that side of the spring upon which the bolt is mounted, are provided with two eyes 22, and extended slidably through these eyes are wire cable members 23, connected at one end to respective wings 17, and extending longitudinally outward along the spring 10 and fixed in a suitable manner at their outer ends in the apertured lower or inner end of the bar 14. Thus, it will be seen that when one of the wings is depressed with the device in an upright position, the bar 14 engaged through the tenon 12 and the wire 23 under proper tension—the bowed spring will be inclined toward the side at which the wing is depressed, and the opposite wing will be raised, drawing upon the respective wire 23 coengaged therewith, whereby the bolt 14 is drawn downwardly, releasing the tenon and allowing the spring to fly into rectilinear form. For the utilization of the action of the spring, a woven wire cable 25 is secured at opposite ends to respective ends of the spring 10 inwardly of the tenon 11, being of a length corresponding to that of the spring between those points of attachment. A thin steel band 26 is secured properly to the wire 25 adjacent the spring 10, whereby the wire is held in a loop conforming to the shape of the spring when bent, insuring a clear space within the loop through which an animal may pass or engage a portion of its body. A snare-block 27 having suitable passages 22 therethrough is engaged slidably upon each end portion of the wire 25 and band 26, the ends of this loop being passed through respective passages of the block 27. The block is conical in shape, whereby it may fit snugly between the adjacent ends of the spring 10 in set position, and the passages 28 therethrough are flared at their ends in such a manner that the wire and steel band of the loop will not be bent so abruptly as to cause a fracture of the metal. The lower ends of the passages 28 are spaced, and they extend convergently upward, being joined, if desired, as shown in the illustration of Fig. 9, although this is not essential. In this manner, when the trap is sprung, the opposite ends of the spring 10 will fly outwardly tending to assume rectilinear form, and naturally the loop formed of the wire 25 and the band 26 will be drawn forcibly through the block until it fits snugly upon whatever part of the animal is interposed therein. The animal will thus be held securely against escape and yet the force of the loop in engagement with the victim is not sufficient to damage the finest pelt.

It will be observed in Fig. 4 that an animal approaching the trap will tend to step upon the wing 17 which is nearest to the animal, which will of course tilt the trap toward the creature, making its engagement with the animal most effective. It might be, of course, that an animal would step over the first wing in its approach, and rest its weight upon the wing 17 at the far side of the trap; in this case, inclining the device away from the animal to some extent. But in this case as the body of the animal would be projected partly through the trap and its head advanced therebeyond when it steps upon the far wing, the movement of the trap would not be sufficient to cause it to fail in its operation.

In Fig. 6 there is shown a modification of the trap in which a similar construction of the spring 10', tenon, and engaging bolt, as well as the loop and snare block, are used as first described except that the wings 17 are omitted. The knuckle member 18', corresponding to the one 18 first described, is made much larger and interposed between the pivot bolt 21' and the inner face of the knuckle there are suitable washers 28 disposed at each end of the bolt. Inwardly of these washers the knuckle member 21' is apertured at longitudinally spaced points, wire spring members 30 being extended through the apertures and coiled in opposite directions around the bolt and engaged with the knuckle 18' as shown at 30', under tension to hold the spring 10' disposed thereover and in vertical position when sprung. The screw member 19' is bifurcated intermediately of the ears 20, and pivoted in the bifurcation there is the bait trigger 31, having the upwardly projecting tooth 32 formed thereon outwardly of its pivotal point and arranged to engage over the upper side of the spring 10' when depressed into horizontal position, and hold it against the action of the spring 30. The outer end of the trigger is located at approximately the center of the space within the spring 10' when set, and is provided with a suitable barb 33, upon which a bait may be engaged in the customary manner. The snare block is also modified in this device as shown at 27' being shown formed in sheet metal, instead of a block, as in the previous figures. The cable member 23' corresponding to that first described, is extended slidably through an eye 34, somewhat lower down upon the screw member 19' from the spring 10' than the eyes 22 are spaced from the spring 10, being connected to the inner end of the bolt 14 and to the spring 10' itself, so that when the latter moves into upright position the cable member 23' would be drawn upon by the eye 34 to operate the bolt 14. Thus it will be seen that when an animal bears down upon the trigger 31 after the trap has been set in horizontal position the spring 30 will move the spring 10' toward upright position, and on or before the instant when it reaches the vertical position the cable member will be drawn inwardly, operating the bolt 14 allowing the spring bar 10' to open out drawing inward upon the loop and engaging whatever animal may have been standing thereover.

It will be seen that an extremely simple device is here provided, which may be manufactured at a low cost, the setting and operation of which is extremely simple and which will be very durable in use.

It will be understood that any suitable form of trigger release equivalent to that numbered 31 may be used and other modifications made within the scope of the claims.

In Fig. 10 there is illustrated a modification of the device in which the use of roller to facilitate operation of the bolt 14 is shown.

The rollers, 40, are mounted on each side of the aperture 13', in the left hand end of the spring 10 so as to engage the respective sides of that end of the spring projected through the aperture, as will be understood. Also, the aperture in the tenon 11' is provided with a roller 41, arranged to bear against the bolt 14 so that the friction in this springing of the trap will be reduced.

What is claimed is:

1. A trap of the class described comprising a bar spring tending normally to assume a rectilinear form and adapted to be set with its ends in proximity, devices for holding the spring in set position releasably, means operable by an animal for release of the spring, a flexible loop member having opposite ends engaged with respective ends of the spring and adapted to form a loop therewithin when the spring is bent, and a snare block carried slidably by and engaged upon the end portions of the loop and adapted to be forced toward the victim by opening of the spring for the purpose described.

2. A device of the class described comprising a bar spring adapted to be bent with its end portions in proximity, releasable devices for holding the spring in bent position, a knuckle equivalent upon the lower side adjacent its middle, a support member pivotally engaged therewith, animal actuated means to oscillate the spring, guide means on the support member spaced from the spring, flexible members connected to said spring engaged slidably through the guide members and connected to said releasable devices for release of the spring as described, and a noose device connected with the opposite ends of the spring for contraction of the noose upon opening of the spring for the purpose described.

3. A device of the class described comprising a resilient bar member adapted to be bent into a loop form, devices for holding the spring in bent form, a knuckle equivalent carried upon the under side of the spring adjacent its middle, a support member engaged pivotally therewith, means for oscillating the spring upon its pivot and connections between the spring and said holding devices for release of the spring upon oscillation thereof; and a noose member connected with the ends of the spring for contraction of the noose upon opening of the spring.

4. In a device of the class described, a bar spring having a laterally projecting apertured tenon at one end, and having an aperture in its opposite end to receive the tenon, a slidable bolt on the apertured side of the spring to engage in the aperture of the tenon, a snare loop member connected with the ends of the spring being adapted to be contracted upon opening of the spring and means operable by an animal for withdrawing the slidable bolt from the tenon for the purpose described.

5. In a device of the class described, a resilient bar spring, means for holding the spring in bent position releasable by an animal, a flexible member connected by opposite ends to respective ends of the spring, a resilient metallic band carried by the flexible member and adapted to hold said flexible member in conformity with the shape of the spring when bent and a snare block slidably engaged over the opposite end portions of the loop for the purpose described.

In testimony whereof I have hereunto set my hand in presence of two subscribing witnesses.

JOHN LA FRENIER.

Witnesses:
C. A. LEWIS,
D. J. SEVERANCE.

---

Copies of this patent may be obtained for five cents each, by addressing the "Commissioner of Patents, Washington, D. C."